United States Patent
Masuyama

(10) Patent No.: US 8,091,977 B2
(45) Date of Patent: Jan. 10, 2012

(54) INKJET PRINTING APPARATUS AND INKJET PRINTING METHOD

(75) Inventor: Atsuhiko Masuyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 12/388,963

(22) Filed: Feb. 19, 2009

(65) Prior Publication Data
US 2009/0219317 A1 Sep. 3, 2009

(30) Foreign Application Priority Data
Feb. 29, 2008 (JP) ................................. 2008-051261

(51) Int. Cl.
*B41J 2/205* (2006.01)
(52) U.S. Cl. .......................................... 347/15
(58) Field of Classification Search ................ 347/9, 15, 347/37, 40, 41
See application file for complete search history.

(56) References Cited

U.S. PATENT DOCUMENTS

| | | | | |
|---|---|---|---|---|
| 5,719,601 | A | * 2/1998 | Moore et al. | 347/9 |
| 6,135,656 | A | * 10/2000 | Kato et al. | 400/120.15 |
| 6,318,832 | B1 | * 11/2001 | Bates et al. | 347/15 |
| 2008/0252686 | A1 | 10/2008 | Kanda et al. | |

FOREIGN PATENT DOCUMENTS

| | | |
|---|---|---|
| EP | 0534634 A1 | 3/1993 |
| JP | 5-202328 A | 8/1993 |
| JP | 2004-168003 A | 6/2004 |

* cited by examiner

*Primary Examiner* — An Do
(74) *Attorney, Agent, or Firm* — Fitzpatrick, Cella, Harper & Scinto

(57) ABSTRACT

When thinning processing is performed to reduce the occurrence of black stripe caused by an overlap between scanning areas that is designed to prevent an end deviation from causing a white stripe, dots printed in a predetermined region by not only an ejection opening array subjected to the thinning processing but also other ejection opening arrays are counted so as to obtain their respective printing duties. Then, a color gamut is obtained based on the printing duties of the respective ejection opening arrays. Then, a thinning rate of the ejection opening array subjected to thinning processing is obtained by referring to a table corresponding to the color gamut, based on the printing duties of the respective ejection opening arrays obtained as above, and the thinning processing is performed. Accordingly, thinning processing can be performed which accurately reflects an amount of actual end deviation.

14 Claims, 19 Drawing Sheets

NORMAL CONVEYING AMOUNT OF PAPER

CASE WHERE PAPER CONVEYING IS ADJUSTED
TO PREVENT WHITE STRIPE

CASE OF NORMAL PAPER CONVEYING AMOUNT

CASE WHERE PAPER CONVEYING IS ADJUSTED
TO PREVENT WHITE STRIPE

INKJET PRINTING APPARATUS AND INKJET PRINTING METHOD

BACKGROUND OF THE INVENTION

1. Field of the Invention

The present invention relates to an inkjet printing apparatus and an inkjet printing method, and particularly relates to reduction of density unevenness, such as so-called joint stripe, which arises from a phenomenon in which an ink ejecting direction is deviated at a boundary between scanning areas of a print head.

2. Description of the Related Art

Heretofore, various image forming apparatuses for printing an image on a printing medium such as a paper sheet and an OHP sheet have been proposed as types in each of which a print head in any of various printing systems is provided. The print heads are available in a wire dot system, a thermal system, a thermal transfer system, an inkjet system, or the like. Especially, the inkjet system has been attracting attention as a system that is low in running cost and is capable of carrying out a highly silent printing operation because the system directly send inks to a printing paper sheet Furthermore, a common type of the above-described printing apparatus is a so-called serial type printing apparatus in which a carriage mounted with a print head moves so that the print head scans a printing medium and performs printing thereto. This serial-type printing apparatus conveys a printing medium by a predetermined amount in a direction orthogonal to the scanning direction after every scan by the print head, and prints an image onto the printing medium according to print data by alternately repeating the scan by the print head and the conveying of the printing medium. This serial printing system includes: a one-pass printing method in which printing an image in a unit area is completed in one scan; and a multi-pass printing system in which printing an image in a unit area is completed in multiple scans.

At a boundary between unit areas in each of which a printed image is completed in a single scan or multiple scans, ink density unevenness in the form of a white stripe may be caused, especially when a density of ink ejected from a print head (print duty) is high.

This phenomenon is considered to be caused when ink ejected from ejection openings located near an end portion of a print head is drawn toward the center side of the print head due to a factor, such as air current. To be more specific, ink from the ejection openings located near an end portion of an ejection opening array of a print head is ejected in deviated directions, and lands on a location moved to the center side of an area for which a printed image is completed. As a result, no ink dot is formed near the boundary between the unit areas, and a white stripe is generated. Since ink ejected from an ejection opening located near an end portion of an ejection opening array is drawn towards the center side of the print head as described above, hereinafter, this phenomenon is called end deviation. When a white stripe is generated due to the end deviation, printing quality is significantly lowered.

A method to prevent the occurrence of the white stripe due to the end deviation and to obtain a high-quality image has been proposed. Japanese Patent Laid-open No. 2004-168003 describes a configuration in a serial scan system in which scanning areas on the printing medium are arranged to partly overlap each other by setting a conveying amount of a printing medium to be smaller than a normal amount so that the white stripes due to the end deviation can be made less noticeable in a high-density region of an image which has a high printing duty. In this technique, on the other hand, in a region in which no end deviation occurs because of a low printing duty, a black stripe may occur due to the overlap of the scanning areas. Thus, it is also proposed that printing data for ejection openings near the end portion is thinned out by an appropriately amount.

However, investigation by the inventor of the present application has shown that the end deviation is not a phenomenon confined to and occurring in each one of ejection opening arrays which are separately provided for respective ink colors or the like. To be more specific, an amount of the end deviation occurring at one ejection opening array is not determined according to only a printing duty of ejection openings near the end portion of the ejection opening array, but is also affected by a printing duty of other adjacent ejection opening arrays. Accordingly, thinning processing performed to prevent the occurrence of the black stripe caused by an overlap between image completing areas, in the case that a printing duty is low and therefore the end deviation does not occur, may not be appropriate.

FIG. 1 is a view schematically illustrating the effect of other adjacent ejection opening array. As illustrated in FIG. 1, a print head 5 is provided with an ejection opening array (nozzle array) for cyan (C) and an ejection opening array (nozzle array) for magenta (M) arranged in a scanning direction in this order. Then, when scan for printing is performed, especially in the case where a printing duty of the C nozzle array located anteriorly in the scanning direction is high, a flow field indicated by arrows occurs near the M nozzle array. In this case, since large air currents flow into the vicinity of the M nozzle array, drawing (end deviation) of ejected ink due to a reduced pressure between nozzles in the M nozzle array is reduced, and thus the size of white stripe is different from that caused by a single nozzle array.

Furthermore, the occurrence of white stripe regarding a certain nozzle array is affected mostly by air currents from an adjacent ejection opening array located anteriorly thereto in a scanning direction, and also affected not only by the anterior ejection opening array, but also by air currents from a posterior ejection opening array. Especially, in the case where a scanning speed of a print head is slow or where a distance between nozzle arrays is small, the effect of such air currents is more significant.

As described above, if the thinning processing on printing data for a joining portion (overlapping region) is preformed according to a printing duty of only one of the ejection opening arrays, as described in Japanese Patent Laid-Open No. 2004-168003, also in the case where multiple ejection opening arrays are arranged next to each other, the resultant thinned-out printing data is unsuitable for an amount of end deviation which actually occurs. As a result, it is impossible to perform high-quality printing dealing with the end deviation with high accuracy.

SUMMARY OF THE INVENTION

An object of the present invention is to provide an inkjet printing apparatus and an ink jet printing method which are capable of reducing the a stripe at a joining portion in consideration of how end deviation is affected by air currents caused by other ejection opening arrays.

In the first aspect of the present invention, there is provided an ink jet printing apparatus that performs printing by scanning a printing medium by a print head in a first direction and ejecting ink to the printing medium based on printing data from the print head arranging a first ejection opening array and a second ejection opening array adjacent to the first ejection opening array, in the first direction, the apparatus comprising: a conveying unit for conveying the printing medium in a second direction intersecting the first direction, the conveying unit conveying the printing medium so that two areas through which the first and second ejection opening arrays pass in different scanning of the print head partially overlap each other; and a thinning unit for thinning printing data corresponding to ejection openings of the first ejection opening array, the ejection openings of the first ejection opening array passing through a partially overlapped area, based on printing duties of printing data corresponding to ejection openings of the first and second ejection opening arrays, the ejection openings of the first and second ejection opening arrays passing through an area including the partially overlapped area.

In the second aspect of the present invention, there is provided an ink jet printing method of performing printing by scanning a printing medium by a print head in a first direction and ejecting ink to the printing medium based on printing data from the print head arranging a first ejection opening array and a second ejection opening array adjacent to the first ejection opening array, in the first direction, the method comprising the steps of: a conveying step of conveying the printing medium in a second direction intersecting the first direction, the conveying step conveying the printing medium so that two areas through which the first and second ejection opening arrays pass in different scanning of the print head partially overlap each other; and a thinning step of thinning printing data corresponding to ejection openings of the first ejection opening array, the ejection openings of the first ejection opening array passing through a partially overlapped area, based on printing duties of printing data corresponding to ejection openings of the first and second ejection opening arrays, the ejection openings of the first and second ejection opening arrays passing through an area including the partially overlapped area.

According to the above-described configuration, when thinning processing is performed to reduce a black stripe to be caused by making an overlap between scanning areas which is designed to prevent an end deviation from causing a white stripe, the thinning processing targeting for one ejection opening array is performed in consideration of not only a printing duty of the target ejection opening array, but also a printing duty of another adjacent ejection opening arrays. Accordingly, thinning processing can be performed which accurately reflects an amount of actual end deviation that occurs due to air currents caused by ink ejection not only from the target ejection opening array but also the adjacent ejection opening array. As a result, a good reduction of the stripes at a joining portion is possible.

Further features of the present invention will become apparent from the following description of exemplary embodiments (with reference to the attached drawings).

DESCRIPTION OF THE EMBODIMENTS

Hereinafter, embodiments of the present invention will be described in detail with reference to drawings.

(Outline of a Printing Apparatus)

Figure 2:
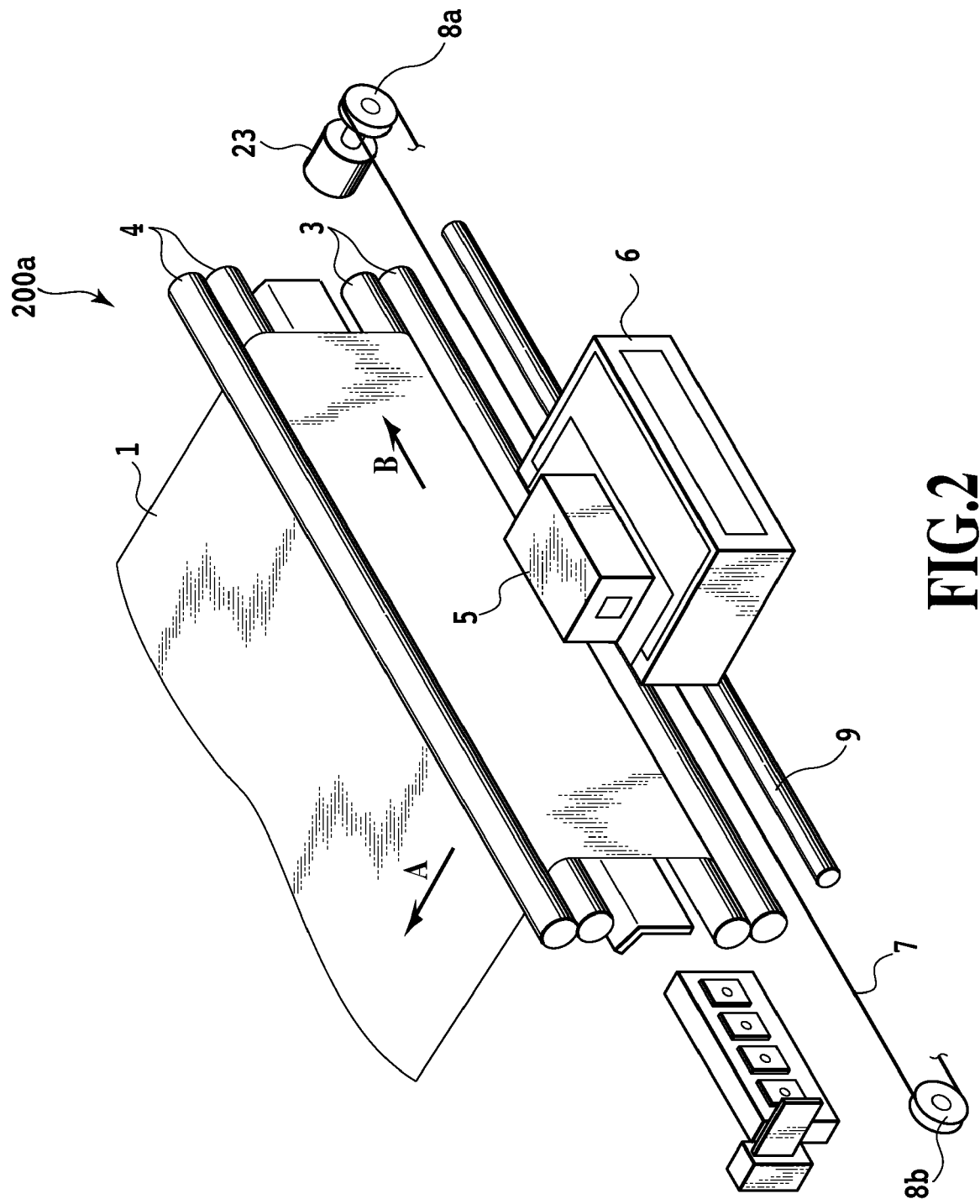
FIG. 2 is a perspective view illustrating an outline of a printing apparatus according to an embodiment of the present invention.

FIG. 2 is a perspective view illustrating an outline of a printing apparatus according to an embodiment of the present invention. A printing apparatus of the embodiment is a color printing apparatus employing an inkjet system. A main part of the printing apparatus includes a printing mechanism 200a which has a structure illustrated in FIG. 2. In FIG. 2, a reference numeral 1 denotes a printing sheet made of paper, a plastic sheet, or the like, and is stored in a cassette or the like in which multiple printing sheets are in a stacked state. When a paper conveying roller (not shown in the drawing) in contact with a surface of a top or bottom sheet 1 in the stacked sheet bundle rotates, the printing sheets 1 are fed from the cassette one by one, and then supplied on a platen at a certain interval. Then, the printing sheet 1 supplied on the platen is conveyed by a pair of first conveying rollers 3, 3 and a pair of second conveying rollers 4, 4, which are driven by respective stepping motors (not shown in the drawing) in a sub-scanning direction (second direction) indicated by an arrow A.

Reference numeral 6 denotes a carriage which is provided to be capable of reciprocative movement along a horizontal guide shaft 9 held in a main scanning direction orthogonal to the sub-scanning direction A. The carriage 6 works with a carriage motor 23 through a belt 7 and pulleys 8a and 8b. When the carriage motor 23 is driven, the carriage 6 can reciprocate along the guide shaft 9. Furthermore, the carriage 6 is mounted with a print head 5 of an inkjet system for performing printing on the printing sheet 1 and with an ink cartridge, which is not shown in the drawing, for supplying ink to the print head. The print head 5 has ejection opening arrays which eject four colors of ink, including C, M, Y, and K, respectively. Each of the ejection opening arrays consists of 512 ejection openings (nozzles).

In the above-described configuration, the print head 5 performs printing of one scan by ejecting ink onto the printing sheet 1 as a printing medium in accordance with printing data while moving in the main scanning direction (first direction) indicated by an arrow B. With this scan, the printing sheet 1 is conveyed by the pairs of conveying rollers 3, 3 and 4, 4 in the direction indicated by the arrow A by a distance equal to a width of a unit area in which an image is to be completed. At this time, if necessary, the print head 5 returns to a home position, and perform processing such as preliminary ejection by use of an ejection recovering device for preventing ejection opening clogging from happening. By repeating the above-described actions, printing can be carried out on the entire printing sheet 1.

Figure 3:
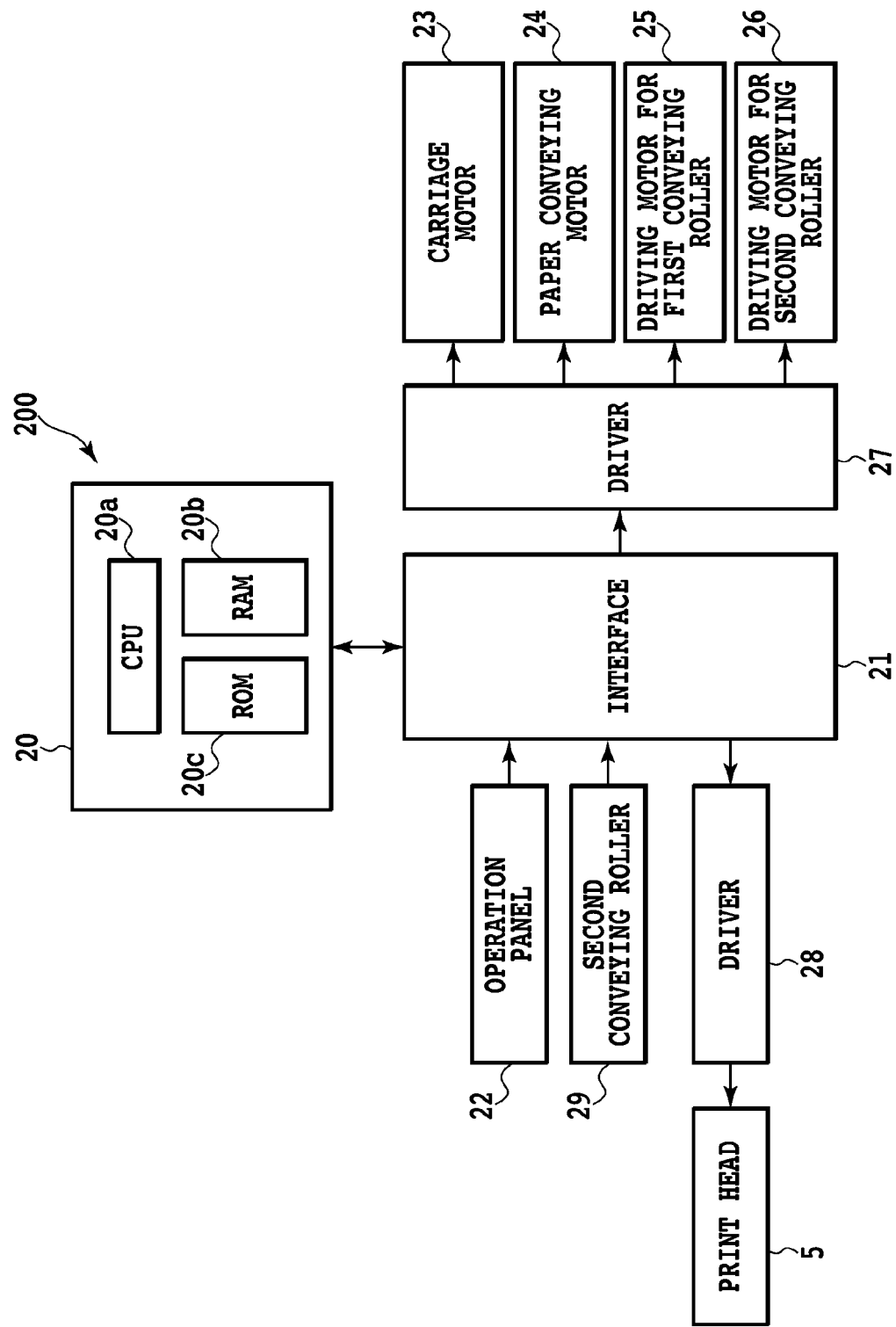
FIG. 3 is a block diagram illustrating a control system of the ink jet printing apparatus illustrated in FIG. 2.

FIG. 3 is a block diagram illustrating a control system of the inkjet printing apparatus 200 illustrated in FIG. 2. An arithmetic control unit 20 of the control system includes a CPU 20a, such as a micro processor, and a ROM 20c for storing a program executed by the CPU 20a to perform processing or like to be described later in FIG. 12, and various data. Furthermore, the arithmetic control unit 20 includes a RAM 20b or the like which is used as a work area in processing by the CPU 20a while temporarily stores various data such as printed image data. The arithmetic control unit 20 is connected to an interface 21, an operation panel 22, a driver 27 for driving the carriage motor 23, a paper conveying motor 24, a first conveying roller driving motor 25, and a second conveying roller driving motor 26, and a driver 28 for driving the print head.

The arithmetic control unit 20 performs, through the interface 21, input and output (information input and output) of various information (for example, character pitch, character type, and the like) from a host 201, which will be described later, an image signal with an external device and the like. Furthermore, the arithmetic control unit 20 outputs, through the interface 21, ON and OFF signals and an image signal which are for driving the various motors 23 to 26, and drives the individual parts in accordance with the image signal.

The inkjet printing apparatus described above uses a print head in which multiple ejection opening arrays each formed by arranging multiple ink ejection openings, and performs printing by ejecting ink onto a printing medium while scanning the print head in a direction intersecting with an arrangement direction of the multiple ejection openings. This apparatus conveys a printing medium so that conveying amount thereof is smaller than the length of each of the multiple ejection opening arrays, when conveying the printing medium in a direction intersecting with a scanning direction of the print head, in order to deal with an end deviation. By this, scanning areas before and after the conveying can overlap with each other, each scanning area being scanned by the multiple ejection opening arrays.

(Outline of Image Processing Apparatus)

Figure 4:
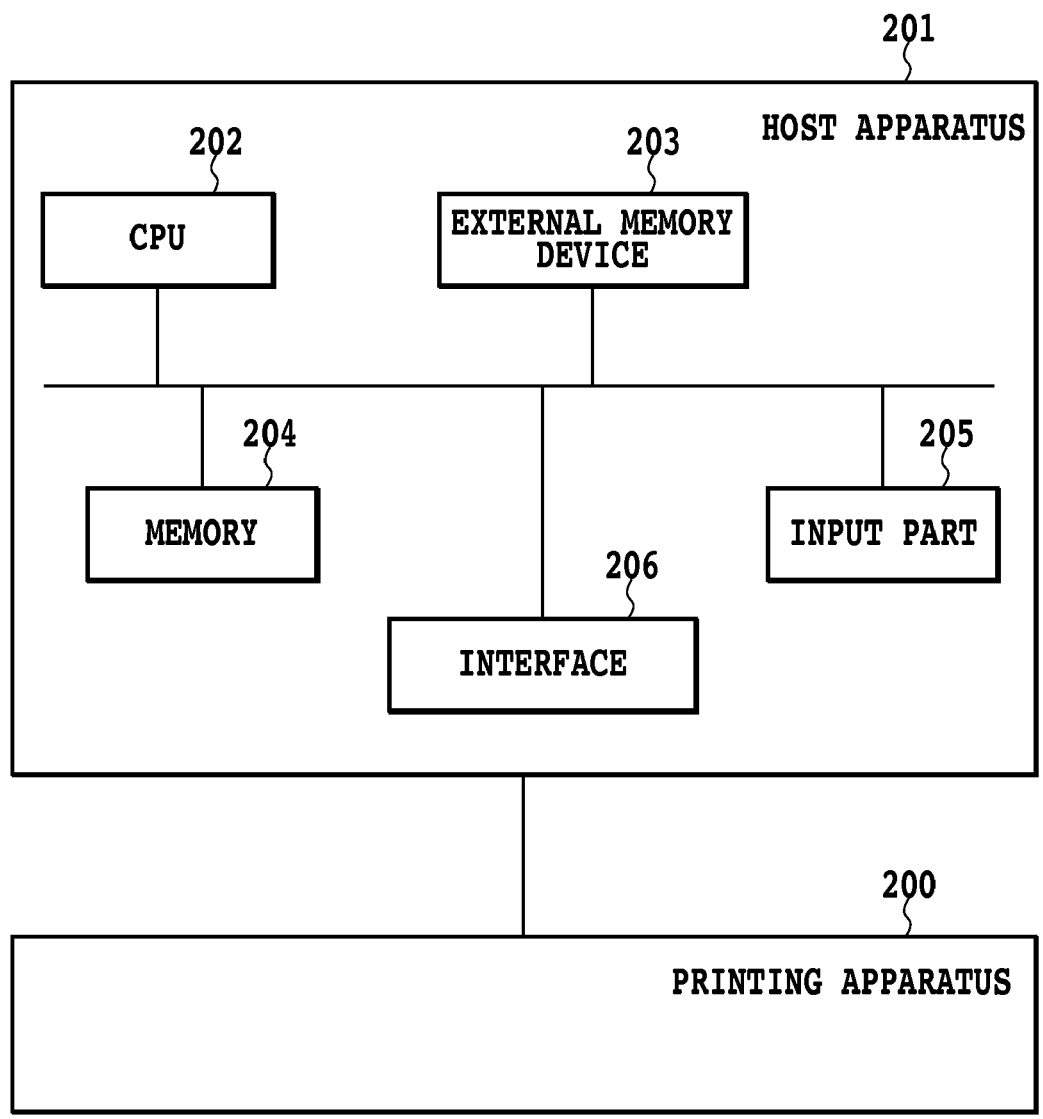
FIG. 4 is a block diagram illustrating an information processing device that generates printing signal data for printing in a printing apparatus.

FIG. 4 is a block diagram illustrating an information processing apparatus which generates printing signal data for performing printing in the printing apparatus 200. To be more specific, FIG. 4 illustrates an information processing structure of a host computer (hereinafter, simply referred to as a host) of the printing apparatus 200. In the drawing, the host 201 has a CPU 202, a memory 204 (printing information generating means), an external memory device 203, an input part 205, and an interface 206 with the printing apparatus 200. The CPU 202 performs processing, such as various operations, discrimination and control by executing a program stored in the memory 204, and is able to execute color processing, quantized processing, correction processing and the like, which will be described later. This program and printing information are stored in the external memory device 203, and read out from the external memory device 203 and temporarily stored in the memory 204. The above-described host 201 is connected to the printing apparatus 200 through the interface 206, and causes the printing apparatus 200 to execute a printing operation by sending thereto image data having been subjected to color processing or the like.

Figure 5:
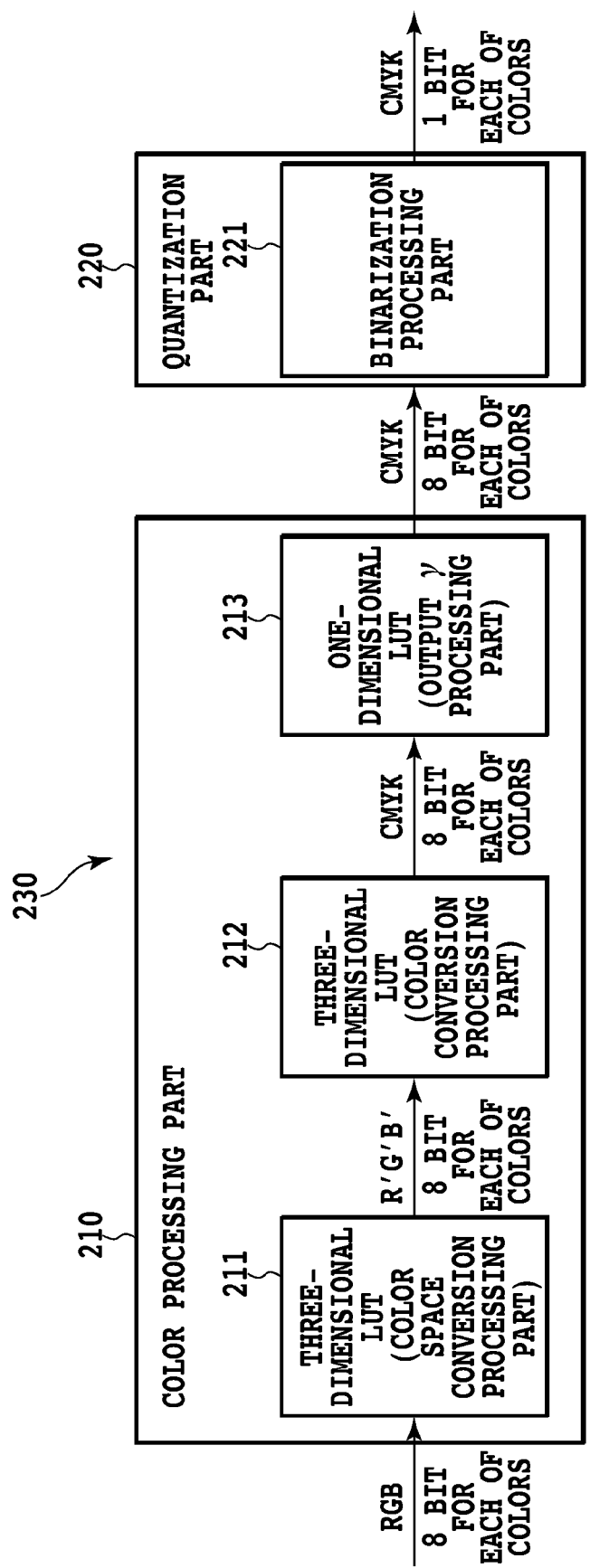
FIG. 5 is a block diagram illustrating a function of an image processing unit achieved by the host device illustrated in FIG. 4.

FIG. 5 is a block diagram showing a function of an image processing part achieved by the host 201. An image processing part 230 outputs inputted 8-bit (256 gradation levels) image data of each of colors R, G, and B as 1-bit data of each of colors C, M, Y, and K. The image processing part 230 is composed of a color processing part 210 and a quantization part 220. The color processing part 210 is composed of a color space conversion processing part 211, a color conversion processing part 212, and an output γ processing part 213. Among these, the color space conversion processing part 211 and the color conversion processing part 212 are constituted by a three-dimensional LUT (look-up table), and the output γ processing part 213 is constituted by a one-dimensional LUT (look-up table). Here, the individual LUTs are stored in the memory 204 in the host computer 201.

In the image processing part 230 having the above-described configuration, bit data of each of the colors R, G, and G which are read out from the external memory device 203 are firstly converted into 8-bit data of each of colors R', G', and B' by the three-dimensional look-up table. This processing is called color space conversion processing (precedent color processing), and is conversion processing for correcting a difference between a color space of an input image and a reproduced color space of an output device. The 8-bit data of each of the colors R', G', and B' having been subjected to the color space conversion processing are converted into 8-bit data of each of colors C, M, Y, and K by the next three-dimensional LUT. This color conversion processing is called subsequent color processing, and is color conversion processing for determining a combination of four colors of ink, C, M, Y, and K, which are used in the printing apparatus illustrated in FIG. 2, to be used to express a color in the color space of the input image.

Note that, image data to be input is often constituted by three additive primary colors (R, G, and B) of a luminescent object, such as a display; however, in the case where a color is expressed by reflection of light, such as in a printer, a color material constituted by three subtractive primary colors (C, M, and Y) is used. Accordingly, the color conversion processing is required. Furthermore, the three-dimensional LUT which is used in the precedent color processing and the three-dimensional LUT which is used in the subsequent color processing discretely hold data, and interpolation processing is used to obtain a correlation of the held data. The interpolation processing is a well-known technique; therefore, a detailed description of the interpolation processing is omitted herein.

The 8-bit data of each of the colors C, M, Y, and K having been subjected to the subsequent color processing are subjected to output γ correction by the one-dimensional LUT constituting the output γ processing part 213. In many cases, the relationship between the number of printing dots per unit area and output characteristics (reflection density and the like) is not a linear relation. Accordingly, by applying the output γ correction, a linear relationship between an output level of the 8-bit data of each of the C, M, Y, and K and output characteristics at that time can be guaranteed.

Thinning processing for printing data at a joining portion provided to deal with an end deviation according to some embodiments in the above-described printing apparatus will be described hereinafter.

First Embodiment

A print head according to a first embodiment of the present invention has 512 ejection openings (nozzles) at a density of 1200 ejection openings per 1 inch (1200 dpi) for one color of ink. In the case of one-pass printing, a conveying amount of a printing medium is (512/1200) inches≈10.84 (mm), while, in the case of N-pass printing, it is a conveying amount obtained by dividing the number of 512 ejection openings by N. In other words, in N-pass printing, 10.84/N (mm), which is obtained by dividing the conveying amount in one-pass printing by N, is a normal paper conveying amount for a single scan.

In both cases of one-pass and multi-pass printing, an only slight error may occur in a conveying operation by a paper conveying mechanism. However, when an end deviation, which is a target of the present embodiment, occurs, even in an ideal state in which there is no above-described error, it is impossible to obtain continuous images across a boundary between former scanning areas and latter scanning area. The end deviation occurs when an image of an intermediate density or above in which ink density (printing duty) of ink ejected into a predetermined region is a relatively high is printed, and thus a white stripe occurs due to the end deviation.

Figure 6:
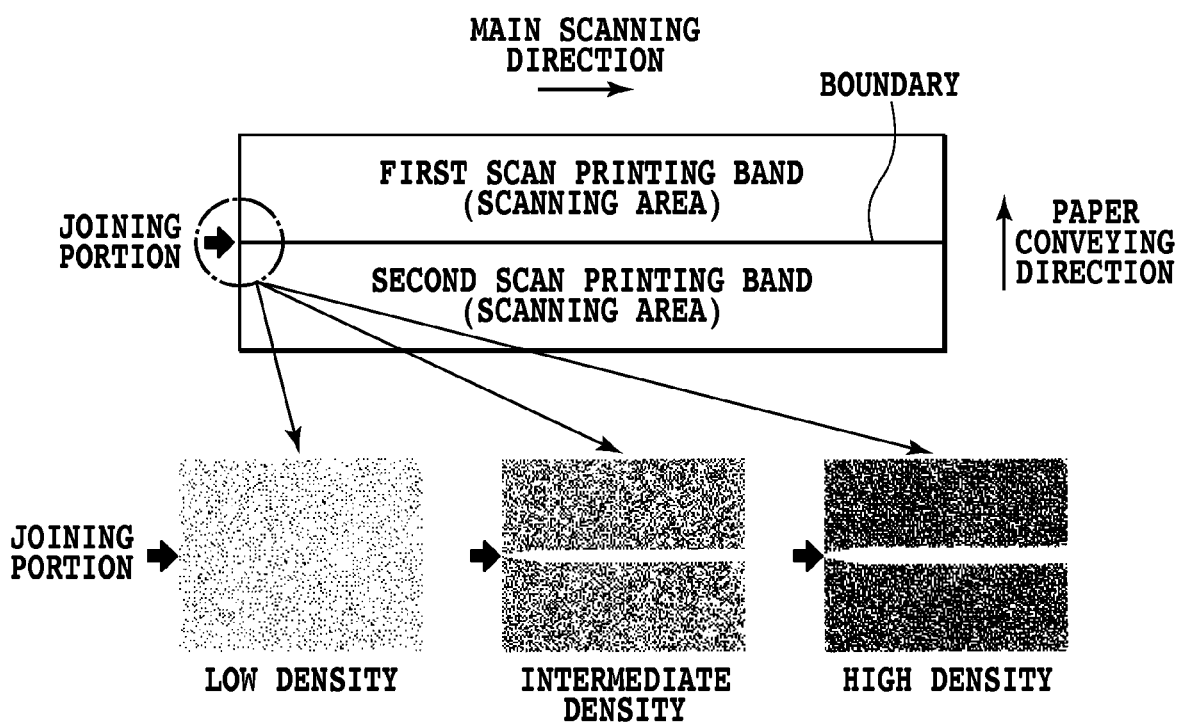
FIG. 6 is a diagram describing a mechanism of the occurrence of white stripe due to end deviation.
Figure 7:
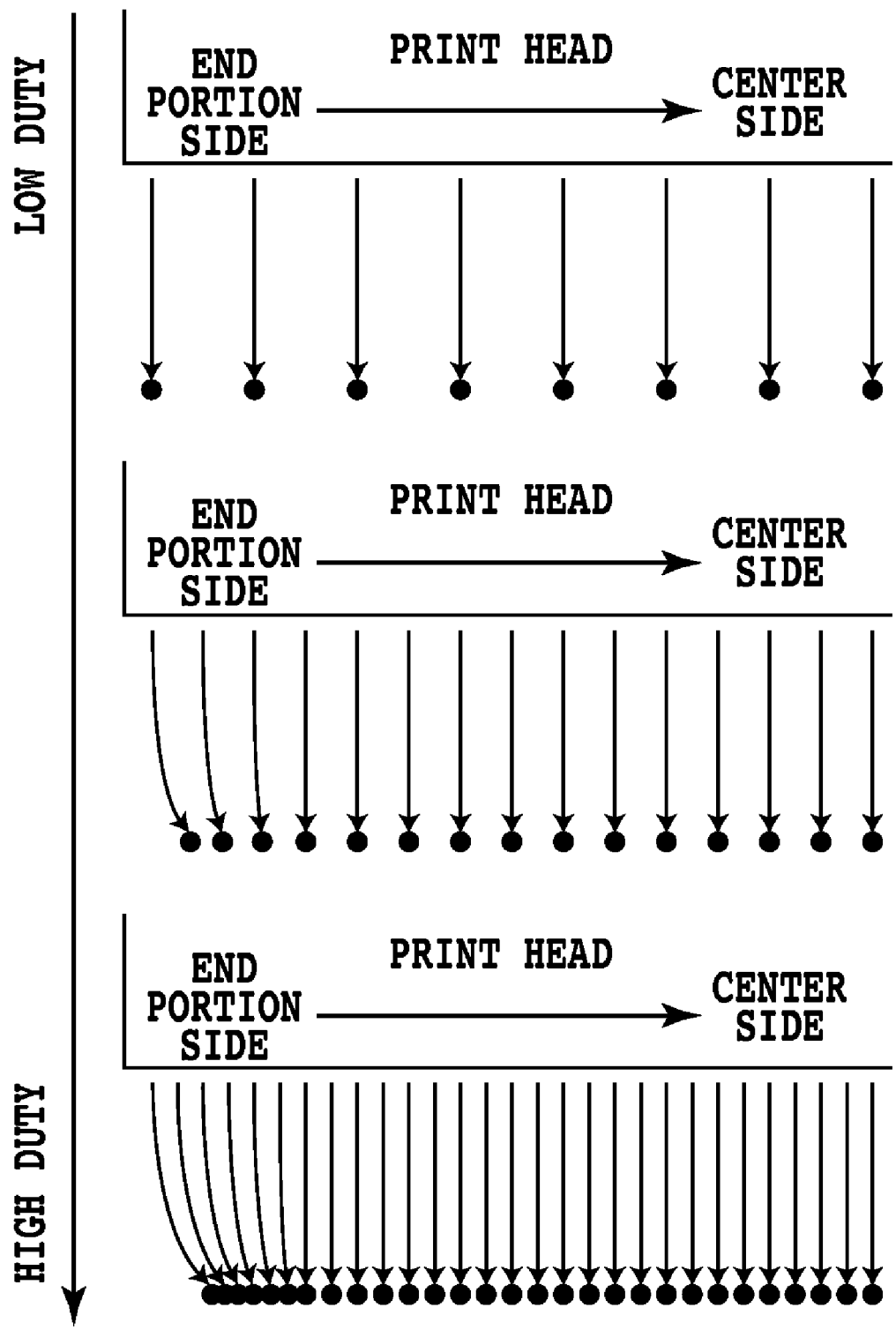
FIG. 7 is also a diagram describing the mechanism of the occurrence of white stripe due to end deviation, and especially, is a view illustrating a difference in end deviation in accordance with printing duty.

FIG. 6 and FIG. 7 are diagrams describing a mechanism of the occurrence of the white stripe due to the end deviation. An ink ejection density when ink is ejected from all nozzles, which correspond to a number of rasters from a boundary of scanning areas, of a nozzle array of one color of ink so as to perform printing on all pixels to which the all nozzles correspond in a scan is defined as a printing duty of 100%. At this time, in the case where the density of an image to be printed is a low density, the printing duty is relatively low, and no end deviation occurs (FIG. 7). When a printing duty becomes high at a density in a range from an intermediate density to a high density, the end deviation occurs accordingly, and an amount thereof becomes larger (FIG. 7). Then, when the end deviation occurs, ink droplets ejected from nozzles of an end portion of the print head do not land at a position in which they are supposed to, and they land closer to the center of the respective scanning areas (FIG. 7). Therefore, when the printing duty becomes above a certain level, in an area near a boundary between adjacent scanning areas (joining portion) in a printed image, a region in which no ink dots are formed (white stripe) is formed (FIG. 6).

As for this white stripe, conventionally, as described above regarding Japanese Patent Laid-Open No. 2004-168003, a conveying amount of a printing medium is reduced in accordance with the width of the joining portion, and adjacent scanning areas are caused to overlap with each other so as to reduce the white stripe. With this, conversely, in printing of a low-density portion in which no end deviation occurs, a black stripe may occur due to the overlap of the scanning areas. Accordingly, thinning-out processing is carried out to prevent the occurrence of black stripe.

Figure 8A:
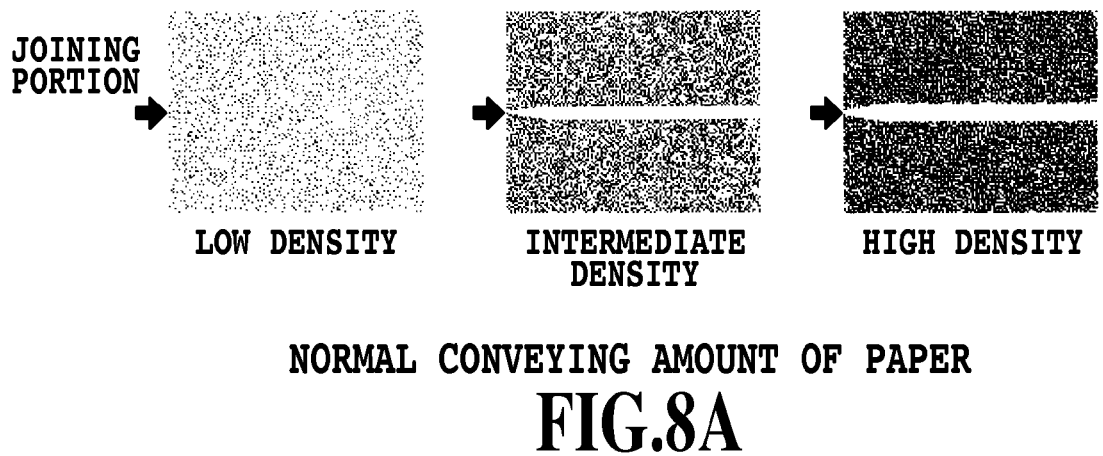
FIGS. 8A and 8B are a view describing a reduction in the occurrence of white stripe and occurrence of black stripe at a relatively-low density part due to the reduction in the occurrence of white stripe.
Figure 8B:
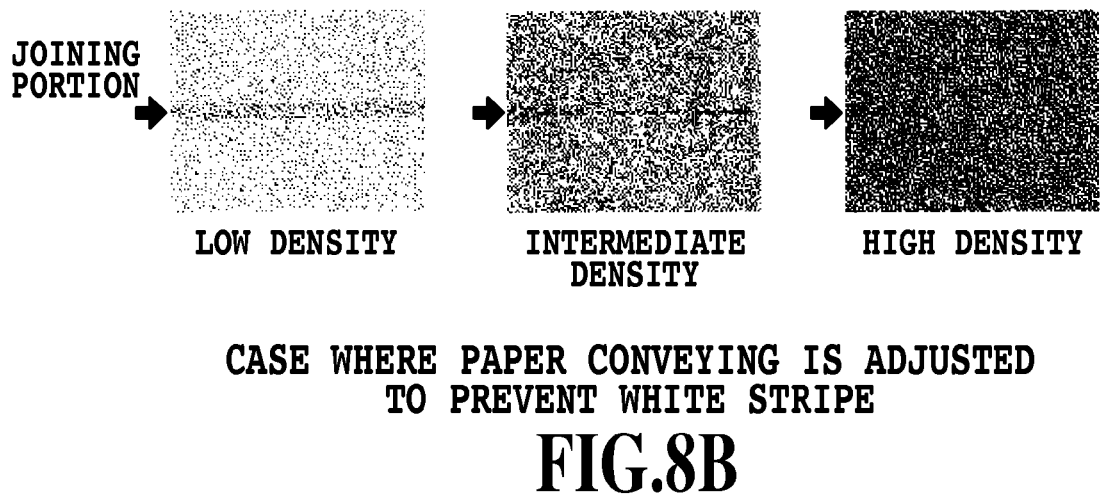

FIGS. 8A and 8B are views showing reduction of the occurrence of white stripe and the occurrence of black stripe at a relatively-low density portion due to the reduction of the occurrence of white stripe. As illustrated in FIG. 8A, when a normal conveying amount which causes no overlap of scanning areas is adopted, a white stripe occurs in an intermediate-to high-density portion due to the end deviation. In contrast, as illustrated in FIG. 8B, an overlap between scanning areas is set by reducing the conveying amount of a printing medium to an approximate level (10 to 50 μm) at which no white stripe occurs when printing is performed at a printing duty of 100% for an ejection opening array of one color of ink. By this, the white stripe is eliminated in printing at a high printing duty at which a white stripe is most noticeable. On the other hand, in this case, especially in a low-density portion, a black stripe may occur by overlapping printing due to the overlap between scanning areas. In order to reduce the black stripe, printing data at the joining portion are thinned out. For example, an amount of ink ejection data to be thinned out is set on the basis of a printing duty of several rasters near the boundary.

Figure 9A:
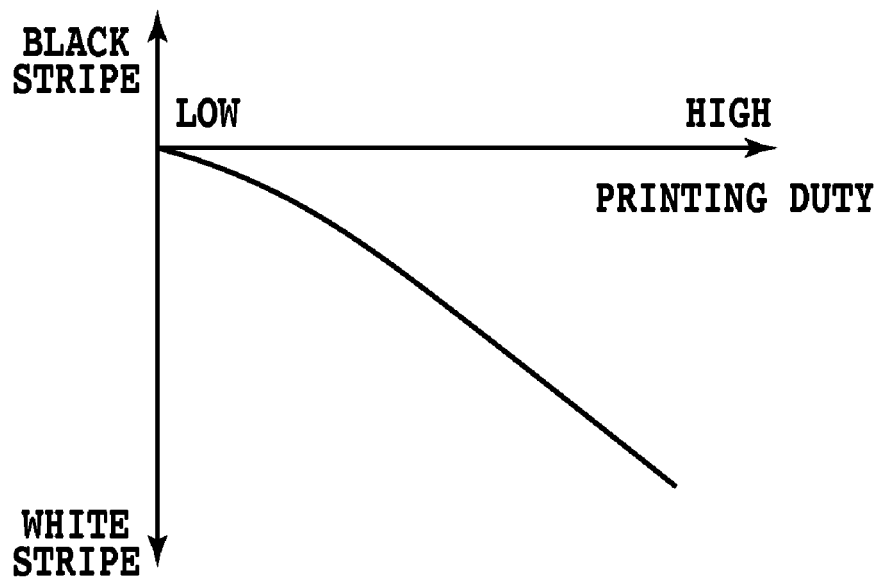
FIGS. 9A and 9B are a view illustrating the relationship of printing duty with black stripe and white stripe.
Figure 9B:
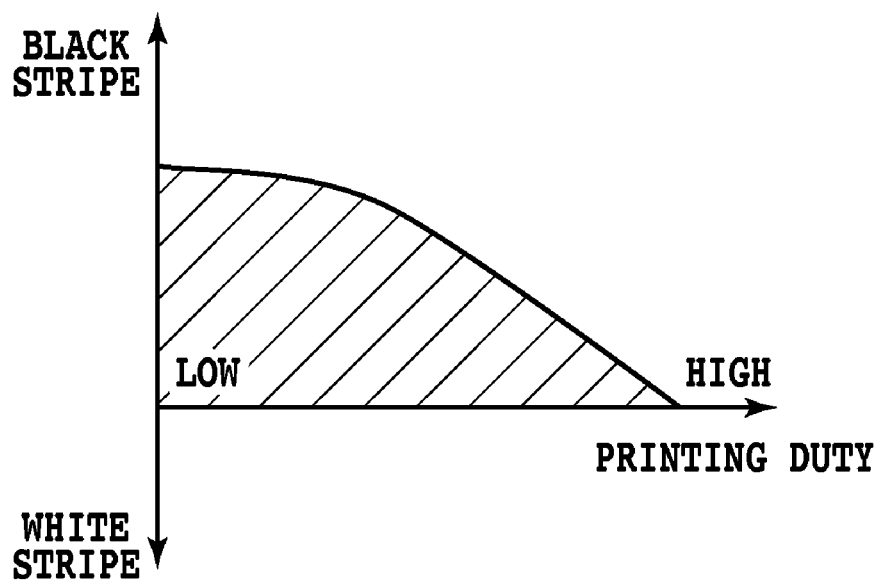

FIGS. 9A and 9B are diagrams illustrating the relationship of printing duty with black stripe and white stripe. The lateral axis represents level of printing duty, and the longitudinal axis represents the level of white stripe or black stripe. FIG. 9A illustrates the relationship when a conveying amount of a printing medium between scans is a normal amount. It is observed that a white stripe appears when the printing duty is increased. FIG. 9B illustrates the relationship when the conveying amount is reduced in order to reduce the white stripe. As shown in the drawing, the occurrence of white stripe is prevented at a high printing duty. On the other hand, as the printing duty is decreased, a black stripe appears due to an overlap between scanning areas. In order to reduce the black stripe indicated by the shaded area, thinning-out processing of printing data is carried out.

In an embodiment of the present invention, the above-described thinning processing for reducing the black stripe due to an overlap between scanning areas for dealing with end deviation is carried out in consideration of not only a printing duty of one nozzle array but also a printing duty of other nozzle arrays.

Figure 1:
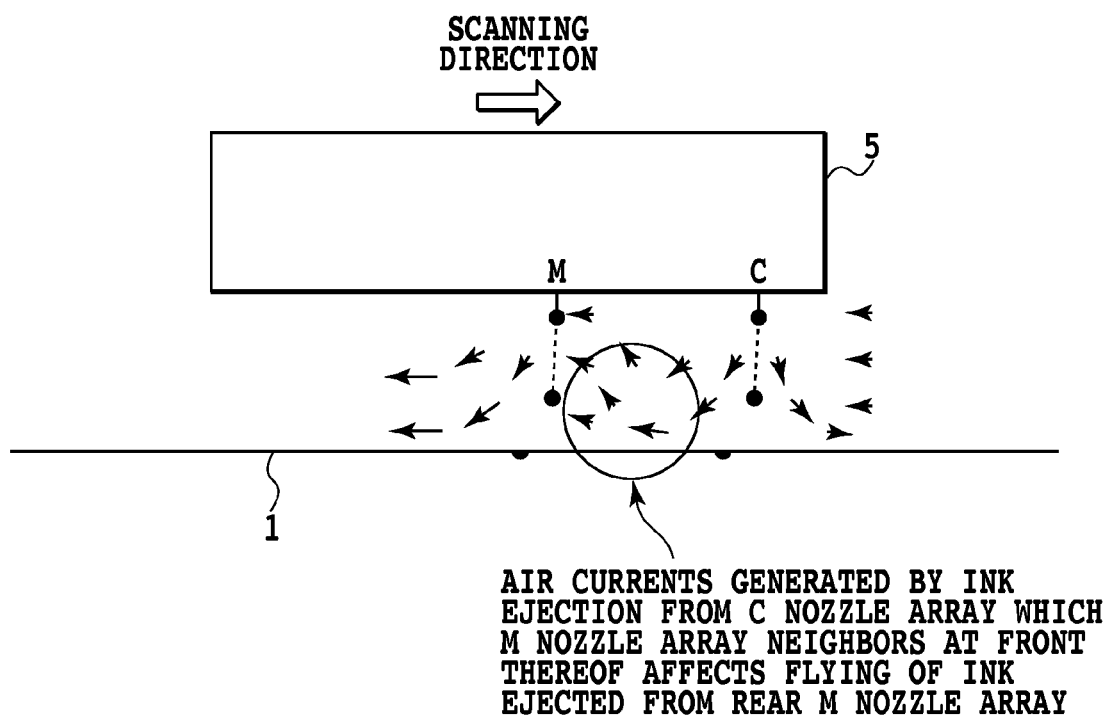
FIG. 1 is a view describing how end deviation of a posterior ejection opening array is affected by air currents caused by ink ejection from an ejection opening array located anteriorly in a scanning direction.
Figure 10:
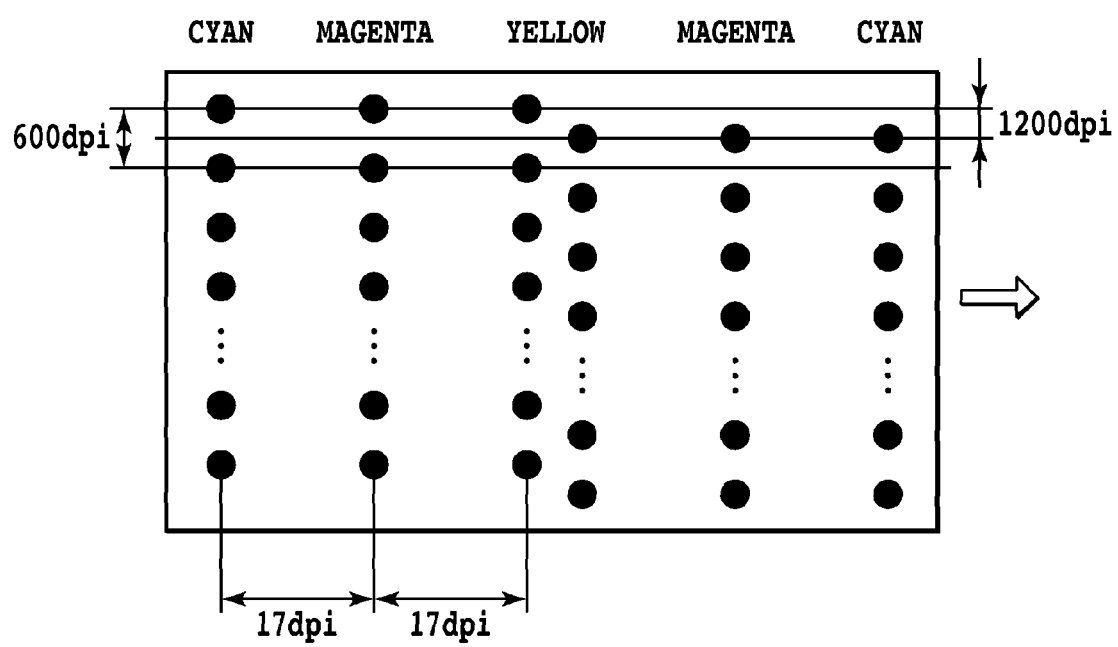
FIG. 10 is a diagram illustrating an arrangement of ejection openings in a print head of an embodiment of the present invention.

To be more specific, the end deviation occurring for one nozzle array is affected not only by the printing duty of the nozzle array. For example, in the case of employing a print head in which nozzle arrays are arranged at a relatively high density as illustrated in FIG. 10, ejection form a nozzle array is affected by air currents generated by ejection of nozzle arrays located anteriorly and posteriorly thereto in a scanning direction of the print head indicated by an arrow in the drawing. As a result, the end deviation is different from that in the case of an ejection opening array for one color. Especially, as described in FIG. 1, when a nozzle array located anteriorly in a scanning direction has a high printing duty, an impact thereof is significant, and a flow of air is generated by ejection of the anterior nozzle array at an area near the nozzle array subjected to the thinning processing. In other words, by air currents flowing into the vicinity of the targeted nozzle array, drawing (end deviation) due to a reduced pressure among nozzles of the targeted nozzle array is reduced. Accordingly, the amount of white stripe is different from that in the case of an ejection opening array for one color.

Figure 11:
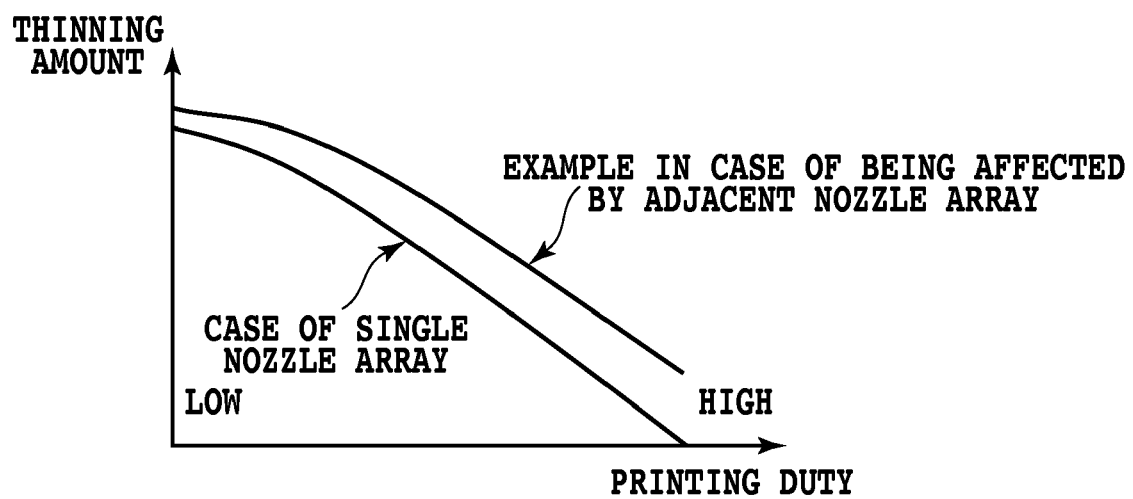
FIG. 11 is a diagram describing an outline of thinning-out processing according to an embodiment of the present invention.

FIG. 11 is a graph describing an outline of the thinning processing according to the present embodiment, and illustrates the relationship between a thinning-out amount and a printing duty of a nozzle array subjected to the thinning processing. In the print head illustrated in FIG. 10, regarding a nozzle array for magenta ink, the end deviation of this nozzle array is affected by air currents caused by ink ejection from a nozzle array for cyan ink as described above. To be more specific, when the end deviation of a nozzle array is affected by an adjacent nozzle array, an amount of the end deviation becomes smaller compared to the case of a single nozzle array. As a result, an overlapping region of scanning areas, which is determined in advance by setting a conveying amount of a printing medium, is large relative to an amount of the end deviation occurring due to an effect by the adjacent nozzle array. In other words, the number of dots printed while overlapping each other becomes relatively large. Therefore, in the case where the end deviation of a nozzle array is affected by ink ejection from an adjacent nozzle array, an amount of printing data to be thinned out is increased. Here, in the present embodiment, an amount of the overlap between scanning areas which is determined in advance by setting a conveying amount of a printing medium is determined in consideration of the end deviation of one nozzle array as described above. This is because there is the case where one-color printing is carried out by using one nozzle array, and the occurrence of white stripe due to an end deviation is also to be appropriately prevented in such a case.

Figure 12:
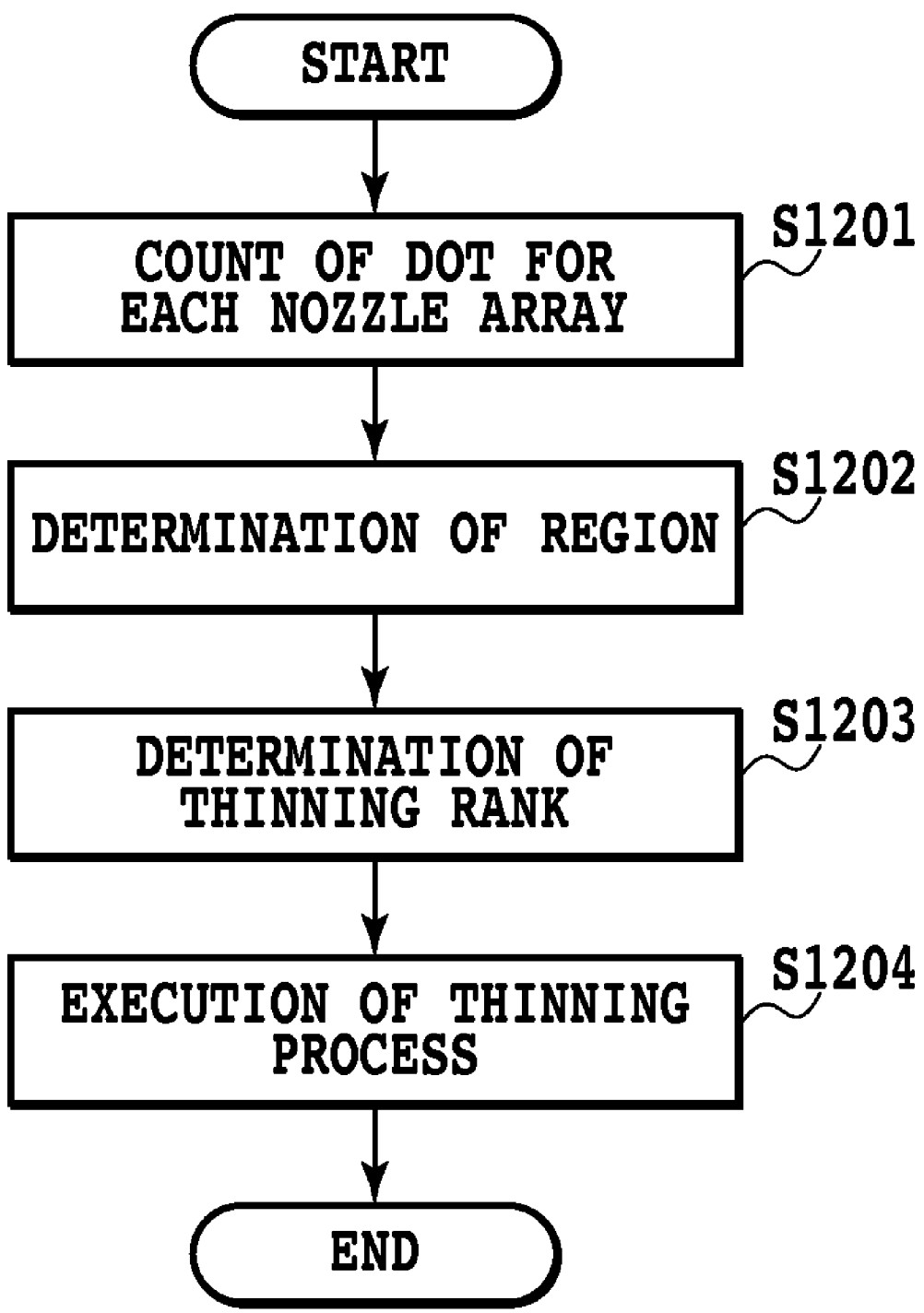
FIG. 12 is a flowchart illustrating thinning-out processing according to a first embodiment of the present invention.

FIG. 12 is a flowchart illustrating the thinning processing according to the present embodiment.

Firstly, in a step 1201, as for printing (ejection) data of a single scan of each of the nozzle arrays for C, M, and Y, the number of dots (ejections) in printing data corresponding to eight nozzles which are configured to print first to eighth rasters from a boundary between scanning areas is counted. Nozzle arrays subjected to the dot counting are, in the print head illustrated in FIG. 10, two nozzle arrays for each of the colors C, M, and Y. To be more specific, in the case of performing printing by scanning in a direction of an arrow in FIG. 10, for example, for C nozzle arrays, printing of 1200 dpi in a longitudinal direction is performed by employing nozzle arrays located at the both ends in the arrangement. The same applies to each of the M and Y nozzle arrays. Since printing is performed when ink is ejected from all of the 6 nozzle arrays illustrated in FIG. 10 in a single scan as described above, the dot counting is performed for all these nozzle arrays in the present embodiment. Then, a count value of the two nozzle arrays for each of the colors C, M, and Y, is used as a count value for one color in a step 1202 and later.

Figure 13:
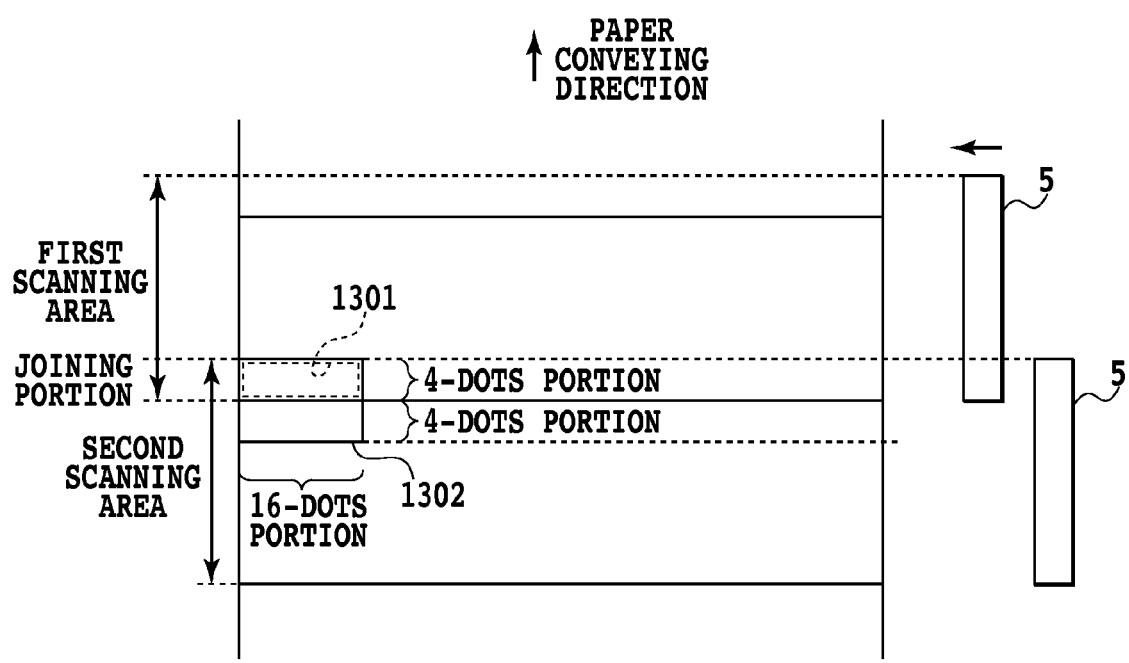
FIG. 13 is a diagram describing a dot-count area and a thinning area according to the first embodiment of the present invention.

FIG. 13 is a diagram describing a dot-count area and a thinning area in the thinning processing according to the present embodiment. After printing for a first scanning area is performed during a precedent scan by the print head 5, a printing medium is conveyed by an amount that is four dots smaller than that corresponding to the width of the nozzle array of the print head, and printing for a second scanning area is performed during a succeeding scan. In the present embodiment, at a joining portion, which is a portion of 4 dots from a boundary of the first scanning area in a paper conveying direction of the printing medium, an area of 16 dots in a scanning direction is set as a thinning area 1301. The thinning processing is performed for each of the thinning areas in accordance with a thinning rate determined by a process which will be described later. This thinning processing may be performed in the precedent scan by the print head for printing the first scanning area, may be performed in the succeeding scan for printing the second scanning area, or may be performed in both of the scans. In the following descriptions, it is configured that the thinning processing is performed in both of the scans.

Furthermore, in the step 1201, dot counting which is performed for each nozzle array is performed for each dot count area 1302, which is different from the thinning area 1301, of 8 dots crossing the boundary of the first scanning area. Here, in the present embodiment, it is configured that the dot count area is different from the thinning area; however, it is only necessary to configure that the thinning area is included in the dot count area, and it may be configured, for example, that processing is performed with these areas as the same area.

Here, as for an additional description of a scanning area, an area through which each ejection opening array passes in a single scan of the print head is a scanning area. Accordingly, in one-pass printing, an overlapping part of scanning areas from two consecutive scans is a joining portion. On the other hand, in multi-pass printing, two scanning areas forming a joining portion are areas through which the print head passes in two scans between which a plurality of conveying operations are performed.

Figure 15:
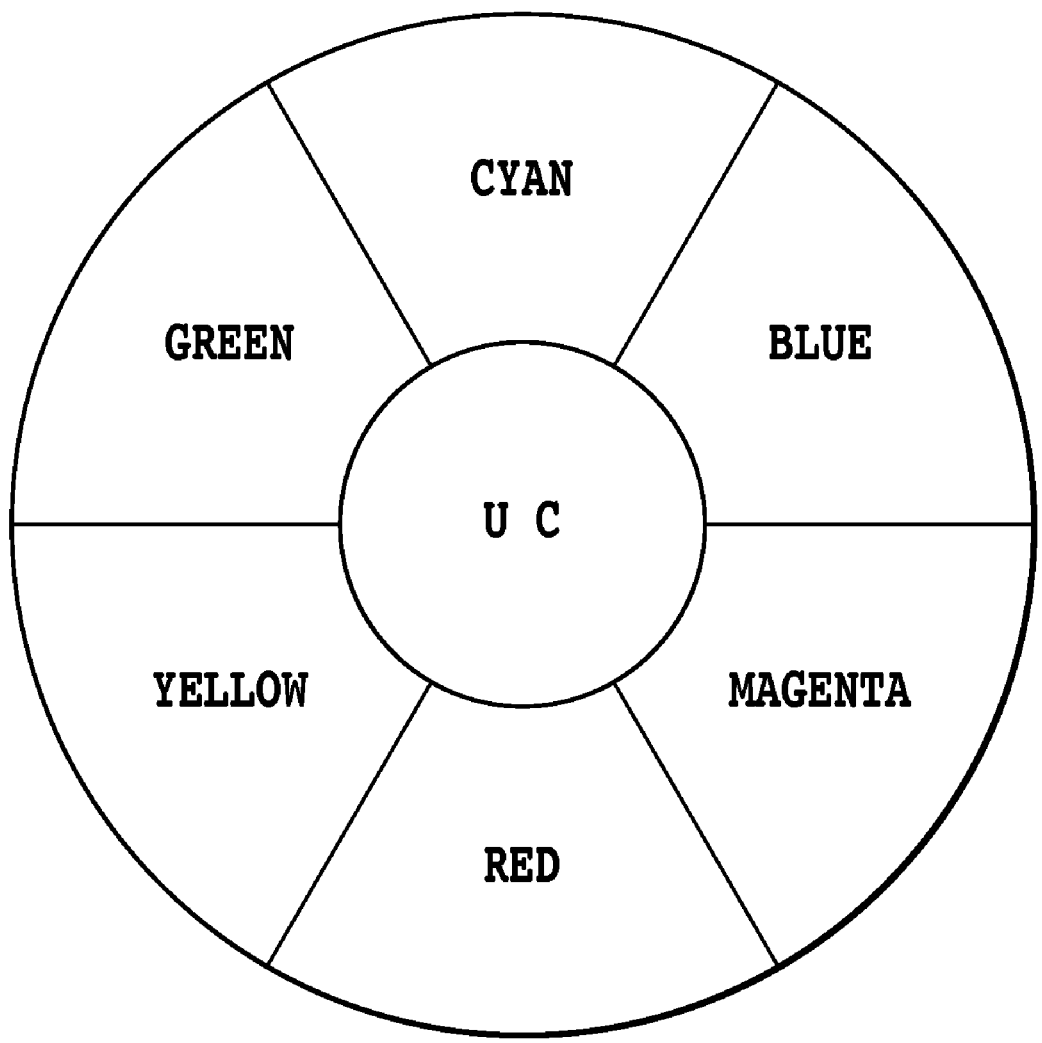
FIG. 15 is a diagram describing a classification of color gamut in the dot-count area according to the first embodiment of the present invention.

Next, in a step 1202, on the basis of the obtained count values of the respective nozzle arrays, a color gamut (hue) of the dot count area is determined. To be more specific, in accordance with the count values of the respective C, M, and Y nozzle arrays, it is determined which of regions of red, green, blue, cyan, magenta, yellow, and UC (corresponds to a black hue), which are illustrated in FIG. 15, includes the dot count area. A specific method of color gamut determination in the present embodiment will be described below.

Figure 14:
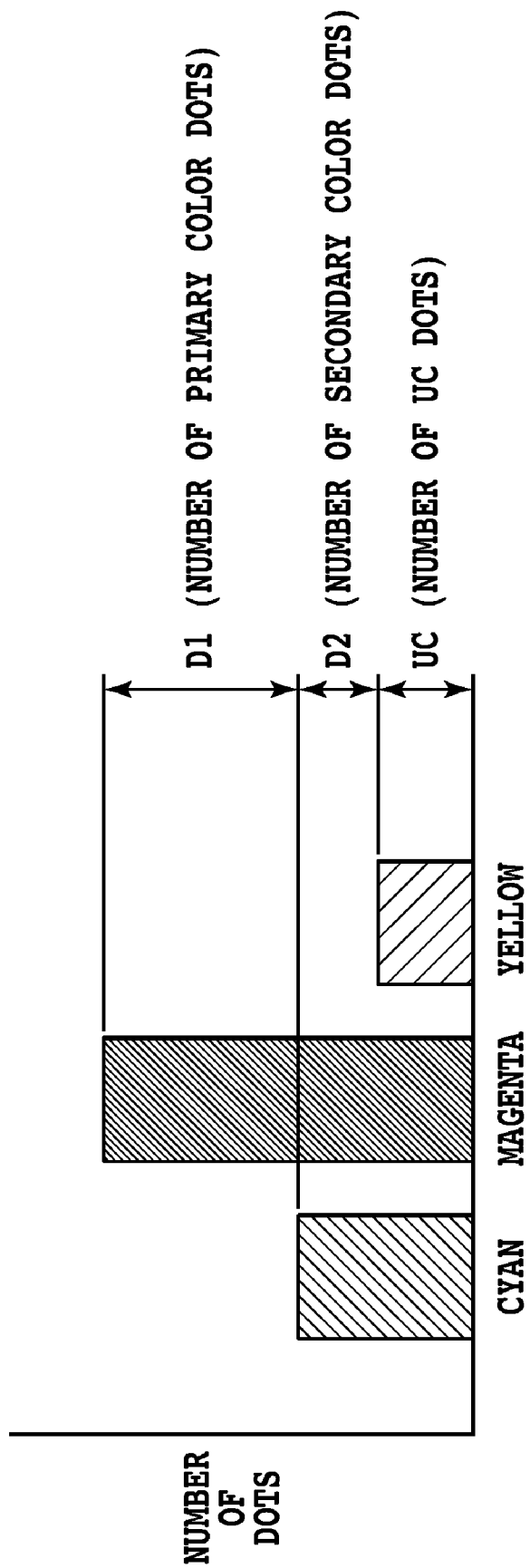
FIG. 14 is a diagram illustrating an example of a dot-count processing result according to the first embodiment of the present invention.

FIG. 14 illustrates an example of dot count values of the respective C, M, and Y colors in the dot count area. In the example in FIG. 14, the decreasing order of dot count value is magenta, cyan, and yellow. Here, among cyan, magenta, and yellow, a part of yellow which is least is a potion generally called under color (UC), a portion obtained by subtracting the UC from the second highest cyan is a secondary color (which is also expressed as D2, and is blue in the present example), and a part obtained by subtracting the second highest cyan from the highest magenta is a primary color (which is also expressed as D1, and is magenta in the present example). These D1, D2, and UC are calculated in the step 1202.

By determining which of these D1, D2, and UC takes the largest value, it is determined which of the color gamut includes the dot count area of interest. In the present example, the D1 is the largest among the three values. Accordingly, it is determined that the dot count area is included in the color gamut of magenta.

Note that, if two or three of D1, D2, and UC are the largest, a color gamut is adopted in the order of UC, D2, and U1 (UC is adopted if UC and D2 are the same, D2 is adopted if D1 and D2 are equal, and D1 is never actually used).

Next, in a step 1203, based on the color gamut determined as described above and a total of the count values of the respective nozzle arrays obtained in the step 1201, a thinning rank is determined by referring to a table. Here, the dot count values of the respective color nozzle arrays are the numbers of dots in an area of the above-described 8 rasters, and therefore can be also expressed as a printing duty of an area adjacent to the boundary of the scanning area. Furthermore, in response, the total of the dot count values can be also expressed as a total of the printing duties of the respective color nozzle arrays.

FIGS. 16A to 16F are diagrams conceptually illustrating tables which are referred to in the thinning rank determination processing. In each of the drawings, the lateral axis represents a total of printing duties (%) of the respective color nozzle arrays, and the longitudinal axis represents printing rates (%). To be more specific, a value obtained by subtracting the printing rate from 100% corresponds to a thinning rate (%).

Figure 16A:
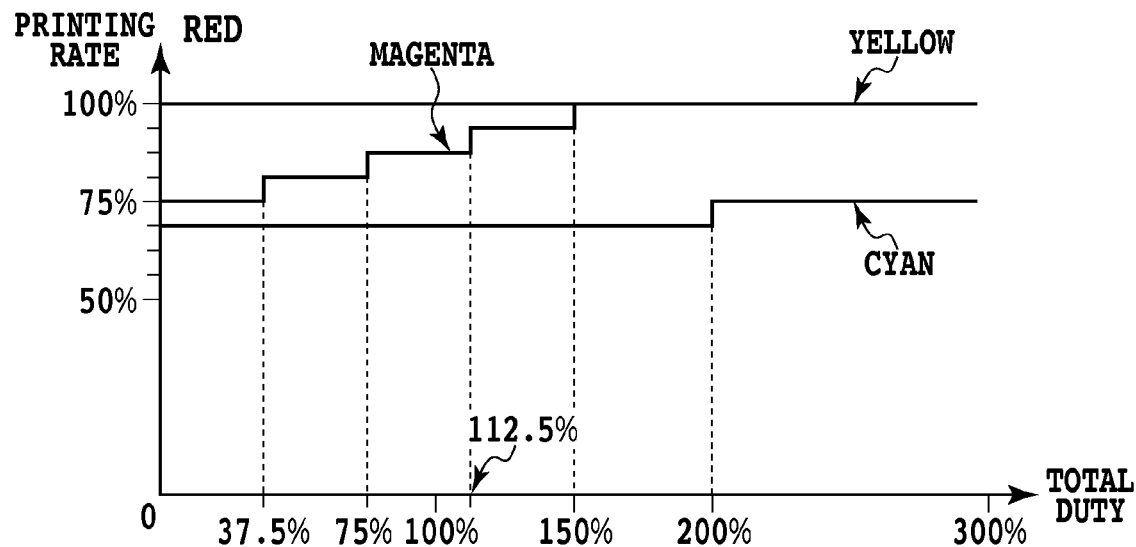
FIGS. 16A to 16F are a diagram schematically illustrating a table which is referred to in thinning-out rank determination processing illustrated in FIG. 12.
Figure 16B:
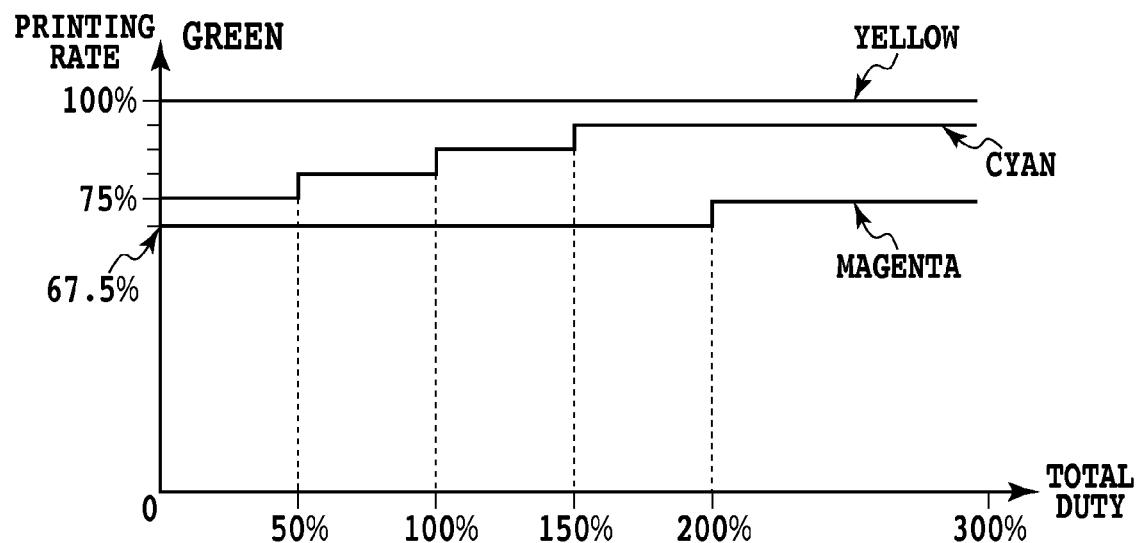
Figure 16C:
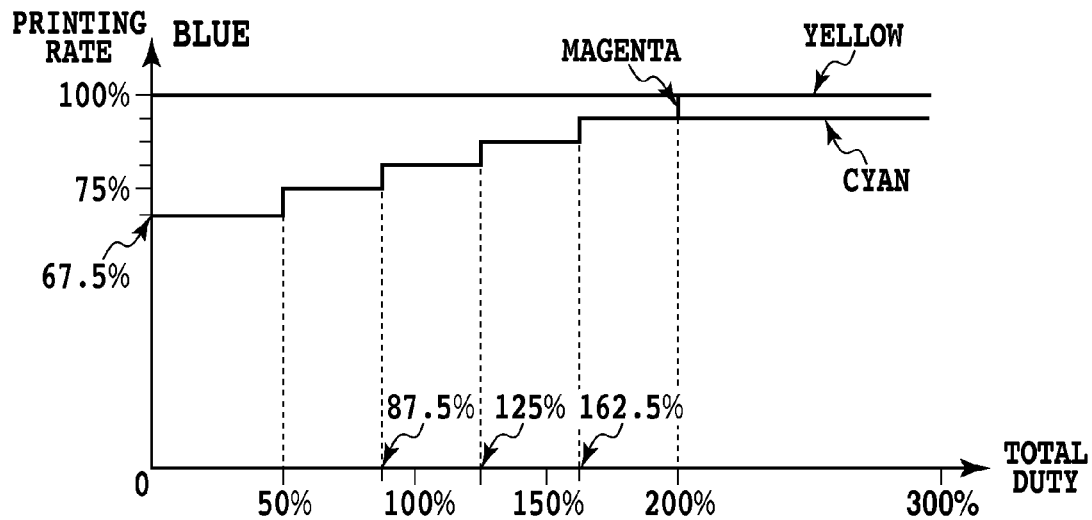
Figure 16D:
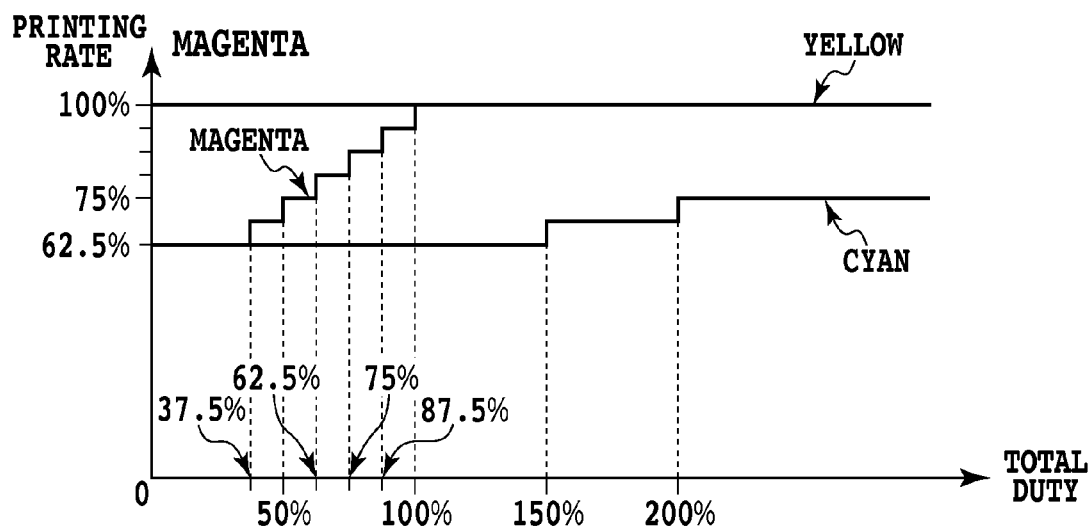
Figure 16E:
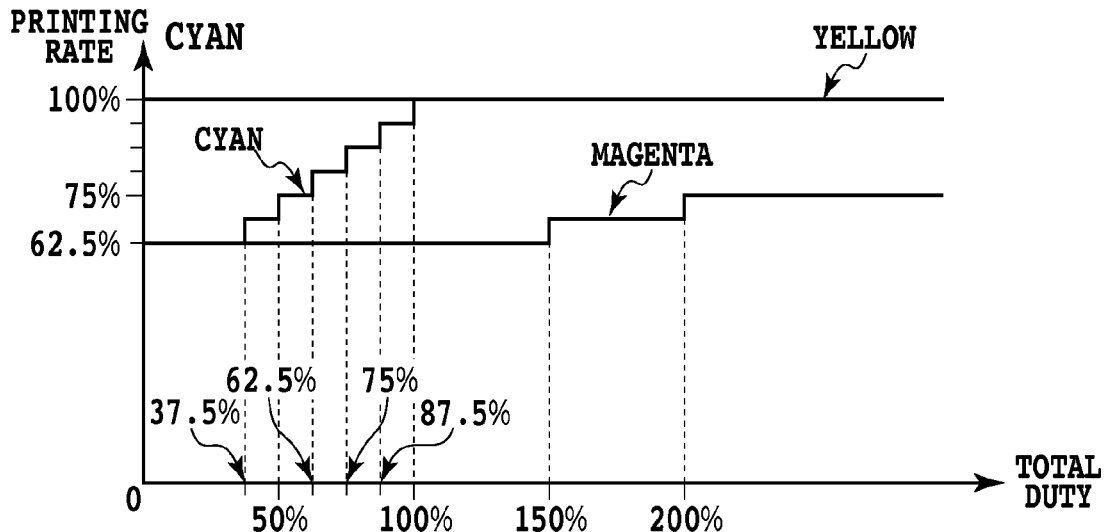
Figure 16F:
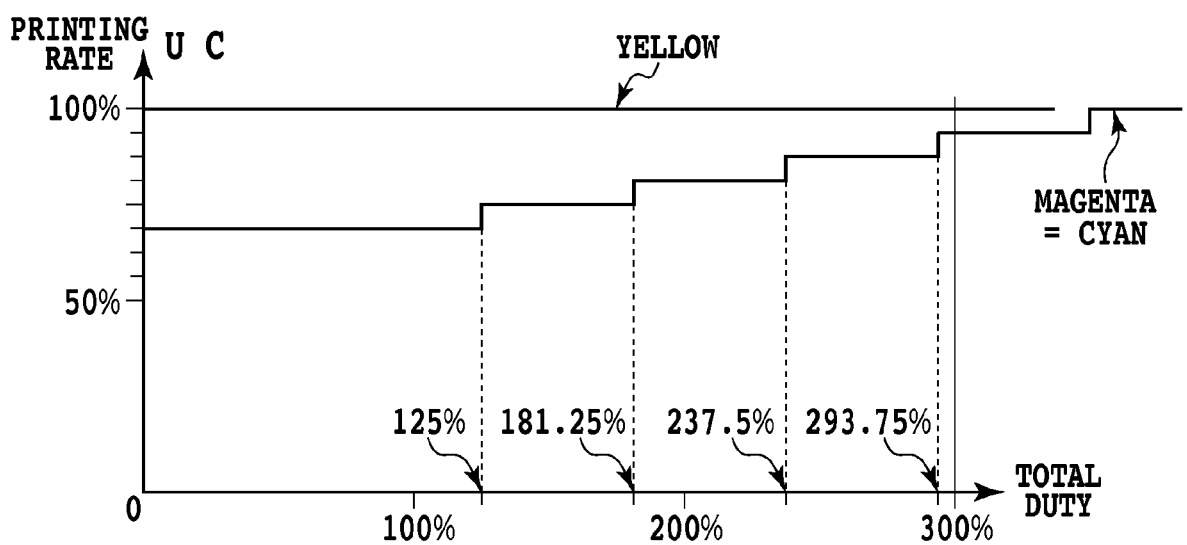

When the color gamut of the dot count area is judged as, for example, red in the region determination in the step 1202, a table for a red region illustrated in FIG. 16A is referred to in the rank determination of thinning rate in the step 1203. Then, consider a case where a total of the printing duties based on the count values of the respective color nozzle arrays obtained in the step 1201 is, for example, 100%. In this case, the printing rates of yellow, magenta and cyan are 100%, 87.5% and 68.75%, respectively. Therefore, the thinning rates of yellow, magenta and cyan are calculated to be 0%, 12.5% and 31.25%, respectively.

Note that, in the present embodiment, in the case where a region is determined as a yellow region as a result of the dot count, since the printing rate of each of the colors cyan, magenta, and yellow is set to 100%, no table for determining a thinning rank in a yellow region is illustrated in FIG. 16. This is because there is almost no possibility that a black stripe is visible even with a low printing duty at a joining portion of a yellow region due to low visibility of yellow.

Furthermore, due to the same reason, as illustrated in FIGS. 16A to 16F, in a color gamut other than the yellow region, the printing rate of yellow ink is also set to 100% so that no thinning processing is performed at the joint portion.

In the following step 1204, the thinning processing is carried out at a thinning rate obtained as described above. In the present embodiment, printing data to be thinned out is printing data of four nozzles which prints the first to fourth rasters from the boundary of the scanning area, which correspond to the thinning area 1301 in FIG. 13. Specific thinning processing is carried out by sequentially thinning out, at the thinning rate obtained as described above, data for printing dots (ejections) of the printing data corresponding to the four nozzles. For example, in the case of a thinning rate of 25%, one of four of the data for printing dots (ejections) is thinned out. Note that, it is obvious that the thinning method is not particularly limited to the above-described configuration. As long as an obtained thinning rate is achieved in whole area to be thinned, the thinning rate may be, for example, varied for each raster.

Here, the tables illustrated in FIGS. 16A to 16F indicate that thinning is performed even for a nozzle array having a total printing duty as high as a maximum of 300%; however, this is not a configuration particularly necessary for application of the present invention. To be more specific, a white stripe occurring in a relatively high density portion due to the end deviation is to be dealt with by reducing a conveying amount of a printing medium so as to make an overlap between scanning areas. Accordingly, in the high density portion in which there is no possibility that the black stripe occurs even due to an overlap of scanning areas as described above, it is obvious that the thinning rate can be set to 0. This is because, in the present embodiment, the above-described configuration is adopted in order to simplify the structure of the hardware which performs the thinning processing, and image quality would not be affected much even if, for example, printing data of cyan is thinned out in the red region (FIG. 16A). Furthermore, the thinning-out process may be performed, as described in Japanese Patent Laid-Open No. 2004-168003, together with thinning for dealing with density unevenness, such as a black stripe, due to a conveying error of a printing media.

Furthermore, the thinning processing illustrated in the above-described steps 1201 to 1204 is performed on nozzles corresponding to both an upper end portion and a lower end portion of a scanning area, both portions forming a boundary. In other words, the thinning processing is performed on printing data of nozzles which are located on the upper end side and the lower end side of the nozzle array of each color and set as described above, based on the printing duty of the printing data.

According to the above-described embodiment, the thinning processing, which is performed at a part having a low printing density for reducing the occurrence of black stripe caused by an overlap between scanning areas formed to deal with the occurrence of white stripe due to end deviation, is performed in consideration of not only the printing duty of a nozzle array data for which is to be thinned but also the printing duties of other nozzle arrays. Accordingly, it is possible to perform thinning processing which highly accurately reflects an amount of actual end deviation occurring due to an effect of air current caused by ink ejection from not only the object nozzle array but also the other nozzle arrays.

Note that, as described above, in the case of using a print head in which ejection openings are arranged at a relatively high density, ejection from a nozzle array is affected by air currents which are generated by ejection from nozzle arrays respectively located anteriorly and posteriorly thereto in a scanning direction of the print head. Therefore, in the present invention, it is only necessary to set a thinning rate of one of the nozzle arrays in consideration of printing duties of the adjacent nozzle arrays to each other in a scanning direction of the print head.

However, in the above-described embodiment, in the nozzle arrangement illustrated in FIG. 10, thinning of printing data of, for example, the magenta nozzle array located second from the right is to be performed in consideration of not only the printing duty of the cyan nozzle array located anteriorly thereto (right side) in the scanning direction but also the printing duty of the posterior nozzle arrays. Furthermore, thinning out of printing data of the cyan ejection opening array located on the very right side is performed in consideration of two ejection opening arrays located anteriorly thereto.

Such a configuration is adopted in order to simplify the structure of the hardware, and it is obvious that the application of the present invention is not limited to such a configuration. The bottom line is that a thinning rate of one of the nozzle arrays may be determined by considering the printing duty of a nozzle array data for which is to be thinned out (first ejection opening array) and the printing duty of a nozzle array (second ejection opening array) adjacent to the nozzle array data for which is to be thinned out.

For example, in the above-described embodiment, when the first ejection opening array is a magenta ejection opening array and the second ejection opening array is a cyan ejection opening array, the thinning rate of the first ejection opening array may be determined by considering the printing duties of the first and the second ejection opening arrays. In the meantime, when the first ejection opening array is a magenta ejection opening array and the second ejection opening array is a yellow ejection opening array, the thinning rate of the first ejection opening array may be determined by considering the printing duties of the first and the second ejection opening arrays. Furthermore, for the yellow ejection opening array as the second ejection opening array, printing duty may not be thinned out, since a black stripe at a joining portion is difficult to be visually recognized.

Note that, preferably, a thinning rate may be determined in consideration of, in addition to the printing duty of ejection opening array data for which is to be thinned out, the printing duty of a nozzle array located anteriorly thereto in the scanning direction. In this case, for example, in FIG. 10, for the cyan nozzle array located in the front-most (right side) in the scanning direction, it is not necessary to take into consideration the printing duties of other nozzle arrays, and the thinning rate is to be set based on the printing duty of itself in a conventional manner.

That is, in the present invention, preferably, combinations of a nozzle array to be subjected to thinning process and an adjacent nozzle array located anteriorly thereto in a scanning direction is to be set in accordance with a position of the nozzle array to be subjected to thinning process in an arrangement of a plurality of nozzle arrays in the scanning direction. Then, for each combination, on the basis of respective printing duties of the ejection opening array to be subjected to the thinning process and the adjacent ejection opening array located anteriorly thereto in the scanning direction, a thinning rate of printing data of the ejection opening array to be subjected to the thinning process is set. In this case, as for an actual value of the thinning rate, a value with which the occurrence of black stripe can be reduced well in a printed image for each printing duty obtained for each combination by conducting an experiment or the like. Furthermore, an amount of thinning out is desirably set smaller when the printing duty of the target nozzle array is higher. Meanwhile, it is desirable that an amount of thinning be set larger when the printing duty of the adjacent nozzle array is higher. This is because, as described above, an amount of the end deviation is reduced when an inflow amount of air currents is increased due to a high printing duty of the adjacent ejection opening array.

On the above configuration, the color gamut determination described in the above-described embodiment is not an essential configuration. The color gamut determination is employed for lumping the above described combinations of nozzle arrays together in a wide scope and combination determination and thinning rate determination processing based thereon are simplified.

Furthermore, the above-described embodiment has been especially described by taking the case of one-pass printing in which printing is completed in one-direction scan as an example; however, the present invention can also be applied to so-called multi-pass printing. To be more specific, the scanning areas on both sides of the boundary described in the above embodiment correspond to divided scanning areas, in which printing is completed in N (an integer of two or larger) scans in multi-pass printing, having a width obtained by dividing a nozzle array into N pieces. Then, the printing duty of the nozzle array can be obtained with nozzles, which respectively print the divided scanning areas, as a unit.

Furthermore, in the above-described embodiment, descriptions have been provided with the print head which has a plurality of nozzle arrays respectively ejecting ink of multiple colors including C, M, and Y as an example. However, the present invention is also applicable to the case where multiple nozzle arrays are provided for one kind of ink, for example, the case where four nozzle arrays are provided for cyan ink. To be more specific, the above-described thinning processing at a joining portion may be performed for, among these four nozzle arrays, one nozzle array and a nozzle array located anteriorly to the nozzle array in a scanning direction, or for all of the four nozzle arrays.

Here, types of ink, for example components constituting inks of cyan, magenta and yellow, are naturally different from each other. Thus, they have different ink droplet flying speeds, different dot sizes, different colors (spectroscopic wavelengths), different infiltration speeds into paper, and the like. Accordingly, a printing duty at which a white stripe becomes noticeable varies for each ink. Furthermore, it is obvious that the printing duty at which a white stripe becomes noticeable varies for different types of paper as a printing medium.

Meanwhile, the occurrence of white stripe due to the end deviation also depends on a distance from an ejection opening of the print head to a paper as a printing medium (hereinafter referred to as ejection opening-to-paper distance). When the ejection opening-to-paper distance is long, the occurrence of white stripe tends to be worse. On the contrary, when the distance is short, white stripe is less noticeable. From this point, when an ejection opening-to-paper distance is adopted which is larger than an ejection opening-to-paper distance set as an escaping position in the case, for example, where there is a possibility that a printing medium, such as a thick paper, damages a print head, it is desirable to additionally set a parameter for the thinning processing.

For an uncoated printing medium with which ink bleed often occurs, such as a plain paper, as described in Japanese Patent Laid-Open No. 2004-168003 described above, the black stripe phenomenon may occur in which the density near a boundary of scanning areas is increased due to spread of ink to a medium. On the other hand, the above described embodiment only focuses on displacement in a landing point of ink droplet due to the end deviation, on the assumption that, for example, a coated paper for inkjet printing or a pre-treatment solution as described in Japanese Patent Laid-Open No. H05-202328 (1993) is provided. However, even in a case where above assumption is not taken into account and printing is performed on a medium which bleeding occurs, it is possible to deal with the problem by adjusting the thinning amount of the present embodiment.

Second Embodiment

Figure 17:
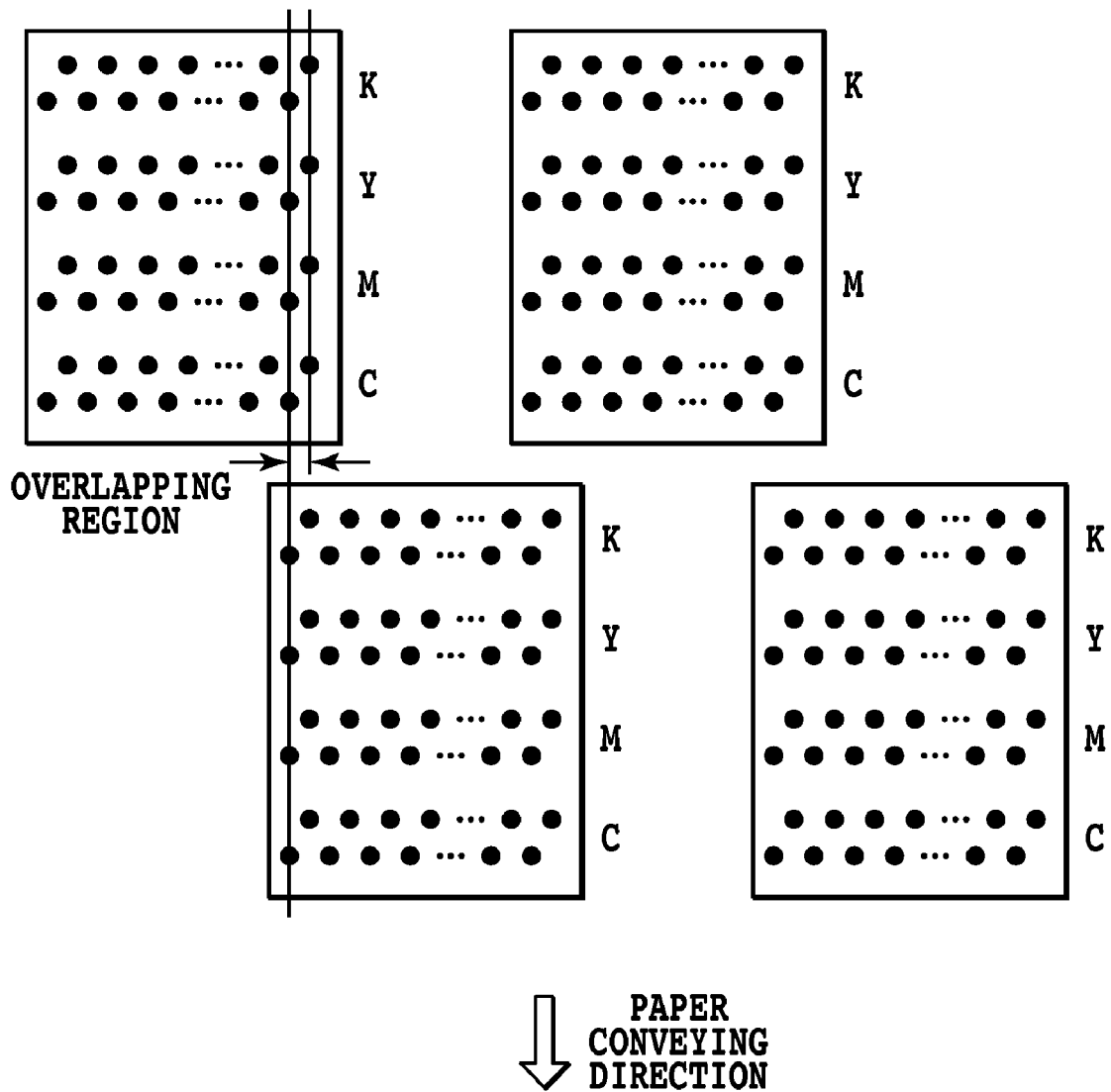
FIG. 17 is a view illustrating an example of a full-line head according to a second embodiment of the present invention.

The present invention can also be applied to the case of using a so-called full-line head in which nozzles are arranged in accordance with the width of a printing medium to be conveyed. FIG. 17 is a view illustrating an example of such a full-line head. The full-line head illustrated in the drawing is constituted by arranging multiple chips, in which nozzle arrays of respective C, M, Y, and K are arranged, so as to form an overlapping part. In the drawing, only four chips are illustrated for simplification.

In the inkjet printing apparatus, a printing medium is to be conveyed in a predetermined direction relative to a print head in which a plurality of head chips having multiple ejection opening arrays formed by arranging multiple ink ejection openings (nozzles), the plurality of chips being arranged so that some of the ejection openings overlap each other in the predetermined direction.

Also in a configuration using such a full-line head, due to conveying of a printing medium, air currents caused by ink ejections from nozzle array may affect other nozzle arrays. In the drawing, when the printing medium is conveyed in the direction of an arrow, a nozzle array K located at the forefront is unlikely to be affected by air currents of other nozzle arrays; however, a thinning amount in consideration of an effect of air currents by a nozzle array located anteriorly is set for printing data of the nozzle arrays Y, M, and C. In other words, thinning processing can be performed on the overlapping part in the overlapping region.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-051261, filed Feb. 29, 2008, which is hereby incorporated by reference herein in its entirety.

What is claimed is:
1. An ink jet printing apparatus that performs printing by scanning a printing medium by a print head in a first direction and ejecting ink to the printing medium based on printing data from the print head arranging a first ejection opening array and a second ejection opening array adjacent to the first ejection opening array, in the first direction, said apparatus comprising:

a conveying unit for conveying the printing medium in a second direction intersecting the first direction, said conveying unit conveying the printing medium so that two areas through which the first and second ejection opening arrays pass in different scannings of the print head partially overlap each other; and a thinning unit for thinning printing data corresponding to ejection openings of the first ejection opening array, the ejection openings of the first ejection opening array passing through a partially overlapped area, based on printing duties of printing data corresponding to ejection openings of the first and second ejection opening arrays which pass through one of the two areas, the one of the two areas including the partially overlapped area.

2. The ink jet printing apparatus as claimed in claim 1, wherein said thinning unit thins the printing data at a lower thinning rate the higher the printing duty of the first ejection opening array is set to be.

3. The ink jet printing apparatus as claimed in claim 1, wherein said thinning unit thins the printing data at a higher thinning rate the higher the printing duty of the second ejection opening array is set to be.

4. The ink jet printing apparatus as claimed in claim 1, wherein the second ejection opening array is arranged anterior to the first ejection opening array in the first direction.

5. The ink jet printing apparatus as claimed in claim 1, wherein the second ejection opening array is an ejection opening array for ejecting yellow ink, and said thinning unit does not thin the printing data corresponding to the ejection openings of the second ejection opening array which pass through the partially overlapped area.

6. The ink jet printing apparatus as claimed in claim 1, wherein the print head arranges a plurality of ejection opening arrays including an ejection opening array different from the first and second ejection opening arrays, and said thinning unit thins printing data corresponding to the ejection openings of the first ejection opening array which pass through the partially overlapped area, based on the printing duties of printing data corresponding to ejection openings of the plurality of ejection opening arrays which pass through the area including the partially overlapped area.

7. The ink jet printing apparatus as claimed in claim 6, wherein the plurality of ejection opening arrays is ejection opening arrays for ejecting a plurality of colors of inks, and said thinning unit thins the print data at different thinning amounts in accordance with a hue determined by respective printing duties of respective printing data according to which the plurality of ejection opening arrays eject.

8. An ink jet printing method of performing printing by scanning a printing medium by a print head in a first direction and ejecting ink to the printing medium based on printing data from the print head arranging a first ejection opening array and a second ejection opening array adjacent to the first ejection opening array, in the first direction, said method comprising the steps of:

conveying the printing medium in a second direction intersecting the first direction, said conveying step conveying the printing medium so that two areas through which the first and second ejection opening arrays pass in different scannings of the print head partially overlap each other; and thinning printing data corresponding to ejection openings of the first ejection opening array, the ejection openings of the first ejection opening array passing through a partially overlapped area, based on printing duties of printing data corresponding to ejection openings of the first and second ejection opening arrays which pass through one of the two areas, the one of the two areas including the partially overlapped area.

9. The ink jet printing method as claimed in claim 8, wherein the thinning step thins the printing data at a lower thinning rate the higher the printing duty of the first ejection opening array is set to be.

10. The ink jet printing method as claimed in claim 8, wherein the thinning step thins the printing data at a higher thinning rate the higher the printing duty of the second ejection opening array is set to be.

11. The ink jet printing method as claimed in claim 8, wherein the second ejection opening array is arranged anterior to the first ejection opening array in the first direction.

12. The ink jet printing method as claimed in claim 8, wherein the second ejection opening array is an ejection opening array for ejecting yellow ink, and the thinning step does not thin the printing data corresponding to the ejection openings of the second ejection opening array which pass through the partially overlapped area.

13. The ink jet printing method as claimed in claim 8, wherein the print head arranges a plurality of ejection opening arrays including an ejection opening array different from the first and second ejection opening arrays, and the thinning step thins printing data corresponding to the ejection openings of the first ejection opening array which pass through the partially overlapped area, based on the printing duties of printing data corresponding to ejection openings of the plurality of ejection opening arrays which pass through the area including the partially overlapped area.

14. The ink jet printing method as claimed in claim 13, wherein the plurality of ejection opening arrays is ejection opening arrays for ejecting a plurality of colors of inks, and the thinning step thins the print data at different thinning amount in accordance with a hue determined by respective printing duties of respective printing data according to which the plurality of ejection opening arrays eject.

* * * * *